(No Model.)
W. R. WHITE.
SLIDING GATE.
No. 308,645. Patented Dec. 2, 1884.
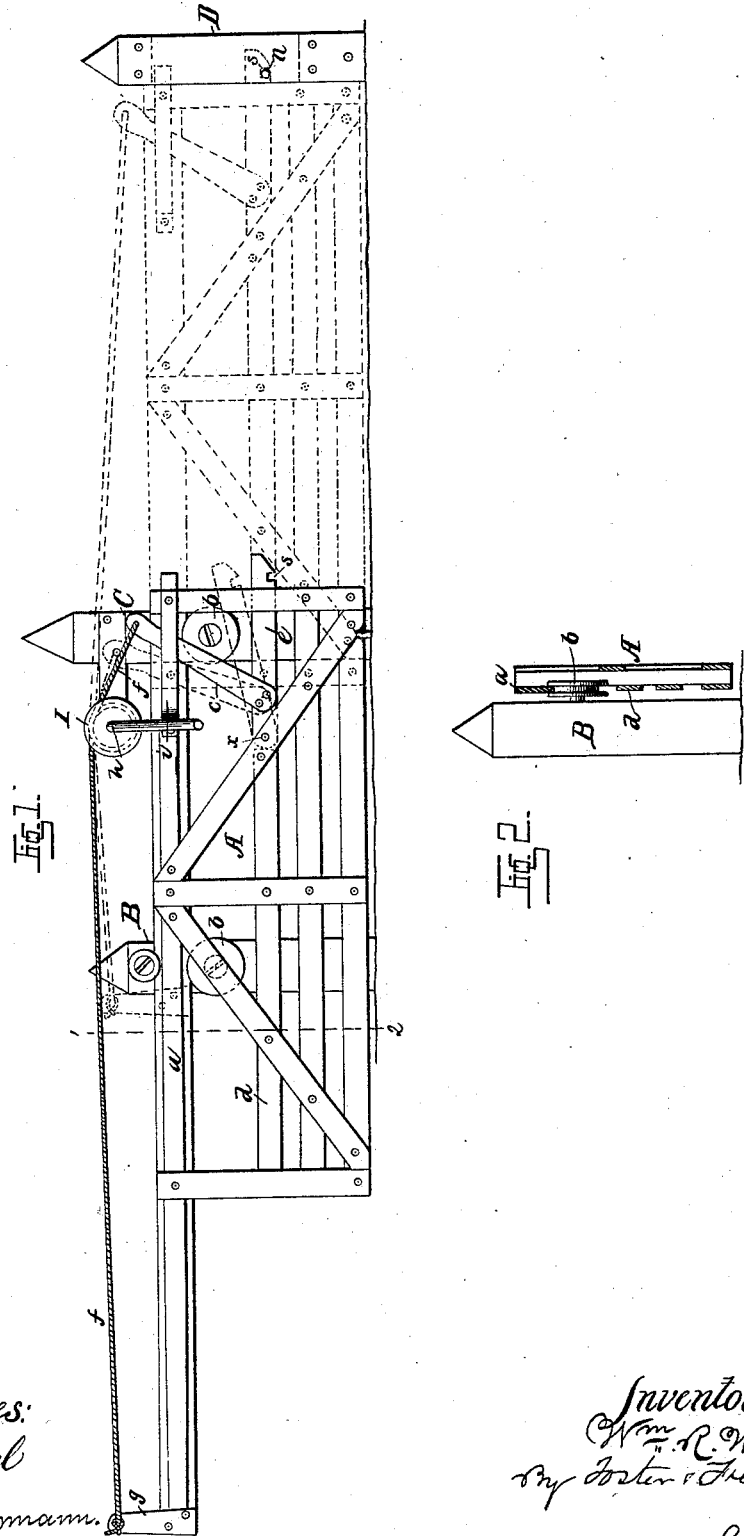
Witnesses:
John G. Hinkel
N. E. Hansmann.
Inventor:
Wm. R. White
By Foster & Freeman
Attys.

UNITED STATES PATENT OFFICE.

WILLIAM R. WHITE, OF NEOGA, ILLINOIS.

SLIDING GATE.

SPECIFICATION forming part of Letters Patent No. 308,645, dated December 2, 1884.

Application filed February 25, 1884. (No model.)

*To all whom it may concern:*

Be it known that I, WM. R. WHITE, a citizen of the United States, residing in the city of Neoga, in the county of Cumberland and State of Illinois, have invented certain new and useful Improvements on Sliding Gates, of which the following is a specification.

My invention is a sliding gate constructed, as fully described hereinafter, so as to facilitate its manipulation and its locking and unlocking.

In the drawings, Figure 1 is a side elevation of my gate with my improvements. Fig. 2 is a section on the line 1 2, Fig. 1.

The gate consists of a panel, A, and an extended top rail or bar, $a$, which rests upon grooved rollers $b\ b$, supported by posts B C, past which the gate slides to and from the post D.

Heretofore it has been common to provide a separate latch for gates, or to move or raise the whole gate or a pivoted panel thereof. This has been done in various ways. My invention is an improvement upon these, and is intended to avoid some of the objections found in gates heretofore constructed, the cord being attached to an arm secured to the latch portion of the panel at its inner end. The panel has vertical, horizontal, and diagonal bars, and one of the horizontal bars is divided into two sections, $d\ e$, the former being fixed to the upright and diagonals and the latter being pivoted at its inner end by a pivot, $x$, to one of the diagonals, and its forward end being beveled and notched, as shown. An arm, $c$, extends from the pivoted piece $e$ upward above the top bar and beneath a guide-strip, $i$, being connected to a rope or cable, $f$, extending to a standard, $g$, at the inner end of the bar $a$.

To a crank-shaft, $h$, turning in bearings supported by one of the posts, is secured a drum, I, round which the cord $f$ is coiled one or more times, so that by turning the shaft and drum the gate will be caused to slide to and fro. As the gate approaches the post D the beveled end of the bar-section $e$ strikes a pin, $n$, and rides on the same until the notch $s$ receives said pin and the gate is locked in its position. Upon turning the drum in the direction to draw back the gate the draft comes first upon the arm $c$, which is carried back to the position shown in dotted lines, Fig. 1, thereby lifting the rail-section $e$ and unlocking the gate, which is then carried back to the position shown in full lines. It will be seen that by pivoting the rail-section as shown I secure a strong and effective lock without adding to the parts or attachments of the gate, the section $e$ acting both as a latch and rail, and that by extending the arm $c$ and standard $g$ upward and connecting the cord $f$ to the upper ends I practically add to the height of the gate.

I claim—

The combination, with the gate and its pivoted rail-section $e$, of an arm, $c$, and a standard, $g$, extending upward above the upper rail, and a drum, I, supported by bearings on one of the posts, and a cord extending round the drum to the arm and standard, substantially as described.

In testimony whereof I have signed my name to this specification in the presence of two subscribing witnesses.

WILLIAM R. WHITE.

Witnesses:
CLINTON WOODS,
DAVID B. GREEN.